United States Patent
Ginsberg

(10) Patent No.: US 10,564,045 B2
(45) Date of Patent: Feb. 18, 2020

(54) TESTING DEVICE FOR A BATTERY

(71) Applicant: Dr. Ing. h.c.F. Porsche Aktiengesellschaft, Stuttgart (DE)

(72) Inventor: Sven Ginsberg, Asperg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 188 days.

(21) Appl. No.: 15/724,446

(22) Filed: Oct. 4, 2017

(65) Prior Publication Data

US 2018/0100771 A1    Apr. 12, 2018

(30) Foreign Application Priority Data

Oct. 12, 2016  (DE) .................. 10 2016 119 385

(51) Int. Cl.
*G01K 7/02* (2006.01)
*H01M 10/42* (2006.01)
*H01M 2/12* (2006.01)
*H01M 2/34* (2006.01)

(52) U.S. Cl.
CPC ........ *G01K 7/021* (2013.01); *H01M 10/4285* (2013.01); *H01M 2/12* (2013.01); *H01M 2/1205* (2013.01); *H01M 2/348* (2013.01)

(58) Field of Classification Search
CPC .... G01K 7/021; H01M 10/4285; H01M 2/12; H01M 2/1205; H01M 2/348
USPC .......................................................... 73/52
See application file for complete search history.

(56) References Cited

U.S. PATENT DOCUMENTS

| 2004/0134259 | A1 | 7/2004 | Haug et al. | |
| 2012/0091029 | A1* | 4/2012 | Morgan | H01M 10/425 206/703 |
| 2012/0134388 | A1* | 5/2012 | Sawa | G01K 1/14 374/179 |
| 2014/0045007 | A1* | 2/2014 | Fritz | H01M 2/1229 429/82 |
| 2014/0205867 | A1* | 7/2014 | Hore | H01M 2/1264 429/50 |
| 2014/0216139 | A1* | 8/2014 | Yang | G01M 3/32 73/49.3 |
| 2016/0131701 | A1* | 5/2016 | Marcicki | G01R 31/003 702/63 |

FOREIGN PATENT DOCUMENTS

| DE | 10301430 A1 | 7/2004 |
| DE | 102013215003 A1 | 2/2015 |
| EP | 2003435 A2 | 12/2008 |
| WO | 2011015554 A2 | 2/2011 |

* cited by examiner

*Primary Examiner* — Tarun Sinha
(74) *Attorney, Agent, or Firm* — RatnerPrestia

(57) ABSTRACT

A testing device for a battery has a housing with a housing opening and is designed to position a degassing element at the housing opening. The testing device has a pressure sensor for permitting at least one detection process of a pressure value during a test, and the testing device has a triggering device which is designed to cause a battery cell of the battery to degas in a controlled fashion.

15 Claims, 3 Drawing Sheets

TESTING DEVICE FOR A BATTERY

CROSS-REFERENCE TO RELATED APPLICATIONS

This application claims priority to German Patent Application No. DE 10 2016 119 385.2, filed Oct. 12, 2016, the content of such application being incorporated by reference herein in its entirety.

FIELD OF THE INVENTION

The invention relates to a testing device for a battery.

BACKGROUND OF THE INVENTION

In electrically driven vehicles, what are referred to as traction batteries are used in order to make available energy for the drive motors. These are usually high-voltage batteries, and the batteries are composed of a plurality of battery modules which are themselves each constructed of individual battery cells. The batteries usually also contain electronics for controlling the charging and discharging and for service functions.

In, the case of defective battery cells, in the case of mechanical deformation of the battery cells or in the case of incorrect electrical connection of the battery cells, degassing of the cells may occur, and owing to the high energy density hot gases may escape and a high pressure can be produced.

For this reason, degassing elements are provided in the battery modules in order to permit pressure equalization with the surroundings and to enable the gas escaping from the battery cells to exit the battery module in a controlled fashion.

In practice it is important that the degassing element is sufficiently dimensioned so that the overall damage in the case of gas escaping is kept within limits. In order to determine a suitable geometry, it is conceivable to use a flow simulations. However, in this context assumptions have to be made with respect to the quantity of gas flowing out of the battery cell, the temperature of the gas and the composition of the gas.

US 2014 0216 139 A1, which is incorporated by reference herein, presents a test device for detecting the escaping of gas from a battery. A steel chamber and two pumps are provided, and the pressure in the steel chamber is reduced in two stages by means of the pumps. The escaping of the gas is analyzed.

WO 2011 015 554 A2, which is incorporated by reference herein, presents a detection device for a test system for testing batteries. A test chamber with an apparatus for detecting and analyzing a gas to be tested is provided.

EP 2 003 435 B1, which is incorporated by reference herein, presents a device for determining the tightness of a lithium ion cell, and the cell to be tested can be moved into an identification fluid and moved out of same by means of a lifting and lowering device within a container.

DE 10 2013 215 003 A1, which is incorporated by reference herein, shows a battery testing system for testing a battery. The battery to be tested is inserted into a testing chamber, and the testing chamber is flooded with insert gas. The inert gas can be discharged from the testing chamber again via a gas discharge device.

DE 103 01 430 A1, which is incorporated by reference herein, describes a method for testing the seal of galvanic elements. The elements are arranged in a closed container and in the case of testing are firstly subjected to an overpressure and subsequently an under pressure.

SUMMARY OF THE INVENTION

An object of the invention is therefore to make available a new testing device for a battery.

The object is achieved by means of a testing device for a battery, the testing device has a housing with a housing opening, is designed to position a degassing element at the housing opening, has a pressure sensor for permitting at least one detection process of a pressure value during a test, and has a triggering device, which is designed to cause a battery cell of the battery to degas in a controlled fashion.

By providing the testing device with the housing it is possible to carry out tests under geometric conditions which correspond to those of the battery to be fabricated. In this way a test result is obtained which corresponds well with the later series battery module. At the same time, the housing can be used repeatedly and this saves costs.

According to one preferred embodiment, the housing is designed to permit detachable connection of the degassing element to the housing. This permits elements to be replaced rapidly without being destroyed.

According to one preferred embodiment, internal thread is provided on the housing in order to permit attachment of the degassing element with a screw. Screws permit a strong connection and this permits large mechanical loading of the degassing element.

According to one preferred embodiments the testing device is assigned a volume body which can be positioned in the housing in addition to the battery cell in order to simulate the presence of additional battery cells. On the one hand, the spatial conditions can therefore be simulated, but this does not require battery cells, which could be damaged during the degassing, to be arranged in the entire spatial region. This reduces the costs.

According to one preferred embodiment, the housing is formed from steel. As a result, a very stable housing is obtained which can be re-used frequently.

According to one preferred embodiment, the housing has housing body to which a housing cover can be detachably attached. As a result it is not necessary to make the degassing element so large that the housing has to be filled through the housing opening. In addition housing covers which are close to series production can also be tested.

According to one preferred embodiment, the testing device is assigned a multiplicity of different degassing elements in order to be able to test different degassing elements.

According to one preferred embodiment, the testing device is assigned at least one degassing device in the form of a perforated plate. Perforated plates are well suited for determining the required cross section of the opening.

According to one preferred embodiment, at east one degassing device in the form of a diaphragm is assigned. Such diaphragms also used in battery modules and therefore solutions close to real conditions can be tested.

According to one preferred embodiment, the triggering device has electrical leads which can be connected to the battery cell in order to permit triggering of degassing via the electric leads. An electrical triggering device can be actuated well and electrical leads can be led through housings in a well-sealed fashion.

According to one preferred embodiment, the triggering device has a plunger with a plunger head, which plunger is designed to permit mechanical deformation of a battery cell in the housing in order to trigger degassing of the battery cell.

According to one preferred embodiment, the testing device is assigned an evaluation device, which evaluation device is designed to evaluate the signal of the pressure sensor during a test. It is therefore possible to arrive at a test result very quickly.

According to one preferred embodiment, the evaluation device is designed to store values of the pressure sensor. As a result, the measurement results can be checked and evaluated even at a later time.

According to one preferred embodiment, the testing device has in the interior a temperature sensor for permitting at least one detection process of a temperature value in the housing during a test. The temperature can also be influenced by the correct configuration of the degassing element, and the evaluation of the temperature sensor can increase the safety.

According to one preferred exemplary embodiment, the triggering device extends through the housing in a predefined housing region, wherein the housing is sealed in this predefined housing region in order to prevent gas from escaping through this housing region and therefore falsification of the test.

BRIEF DESCRIPTION OF THE DRAWINGS

Further details and advantageous embodiments of the invention arise from the exemplary embodiments which are described below, illustrated in the drawing and are not to be understood as a restriction of the invention in any way, and from the dependent claims. In the drawings:

DETAILED DESCRIPTION OF THE INVENTION

Figure 1:
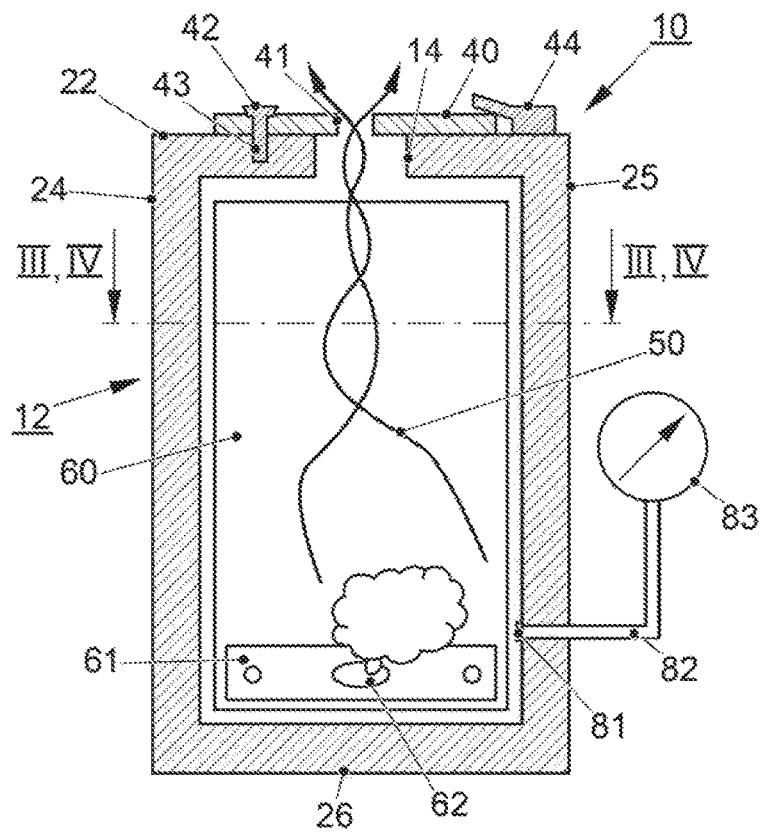
FIG. 1 shows a longitudinal section through a testing device for a battery.

FIG. 1 shows a testing device 10 for a battery. The testing device 10 has a housing 12 with a housing opening 14. A degassing element 40 is arranged at the housing opening 14. Two possible ways of detachably connecting the degassing element 40 to the housing 12 are shown. The housing 12 has an internal thread 43 and the degassing element 40 is attached to the housing 12 by means of a screw 42 which is connected to the internal thread 43. Alternatively or additionally, a clamping device 44 can be provided on the housing in order to secure the degassing element 40. A sensor 81 is arranged in the interior of the housing 12 and is connected to an evaluation device 83 via a sensor signal line 82. The sensor 81 can be, for example, a pressure sensor or a temperature sensor.

Four side faces, of the housing 12 are denoted by the reference symbols 22, 24, 25 and 26. In the interior of the housing 12 a volume body 60 is arranged, and additionally a battery cell 61 is positioned in the interior of the housing 12. The battery cell 61 has a degassing opening 62 from which gas can escape during degassing.

The escaping gas is illustrated schematically with flow lines 50 and can escape from the housing 12 through the housing opening 14 and the degassing element 40.

The housing 12 is preferably of stable design, for example made of metal with a sufficient wall thickness, in particular made of steel. The geometric ratios of the battery or of a segment of the battery can be replicated by the housing 12. The housing 12 is therefore preferably of a size which corresponds to the size of the structure used in the planned series-production model.

The volume body 60 serves to simulate the volume of the other battery cells 61 of the battery and therefore to replicate the flow cross sections and air volumes within the battery better. This permits a saving in costs because the test requires the examination of degassing of only one battery cell 61. If in an individual case the examination requires plurality of battery cells 61, a correspondingly smaller volume body 60 would have to be selected. The extent to which the conditions are replicated with a greater or smaller degree of accuracy by means of the volume body 60 or whether, however, further battery cells 61 are used for the measurement has to be defined for the respective test. In this context, during the first measurements the use of the volume body 60 will be sufficient, and in the case of a measurement just before the start of the series production it is possible, for example, for a measurement with battery cells 61 and without a volume body 60 also to be carried out.

For the actual test, the battery cell 6 is subsequently made to degas, for example electrically or mechanically.

The gas can escape via the housing opening 14 and the degassing element 40, and measured values can be detected by means of the sensors 81 and subsequently evaluated it is subsequently possible, for example, to check whether the maximum pressure occurring in the housing 12 is higher than a predefined limiting pressure and therefore too high, in order therefore to check the suitability of the degassing element 40. The temperatures which occur in the housing 12 can also be used as a criterion for the suitability of the degassing element 40.

In order then to determine a suitable degassing element 40, tests can be carried out with different degassing elements 40. In this context, the important factor, in particular, the cross section of the opening 41. Of course, in the case of a relatively large cross section gases can escape more quickly and therefore the loading on the battery housing is reduced. Diaphragms which, on the one hand, permit gases to pass to the outside but on the other hand prevent, or at least reduce, the penetration of moisture into the battery housing, can also be used as degassing elements 40.

Figure 2:
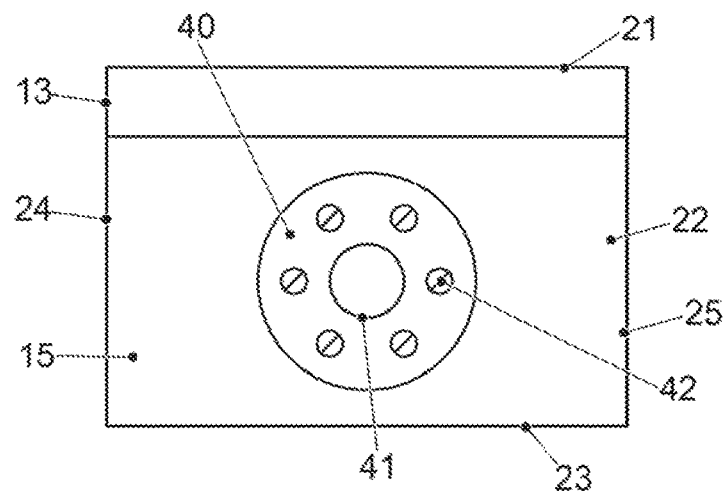
FIG. 2 shows a plan view of the testing device.

FIG. 2 shows a plan view of the housing 12 in the direction of the side face 22. The side faces 21, 25, 23 and 24 are also denoted. The housing 12 has a housing body 15 which is connected to a housing cover 13. The volume body 60 and the battery cell 61 can be positioned in the housing 12 by means of the housing cover 13. The degassing element 40 with the opening 41 is attached to the housing 12 in this exemplary embodiment by means of six screws 42.

Figure 3:
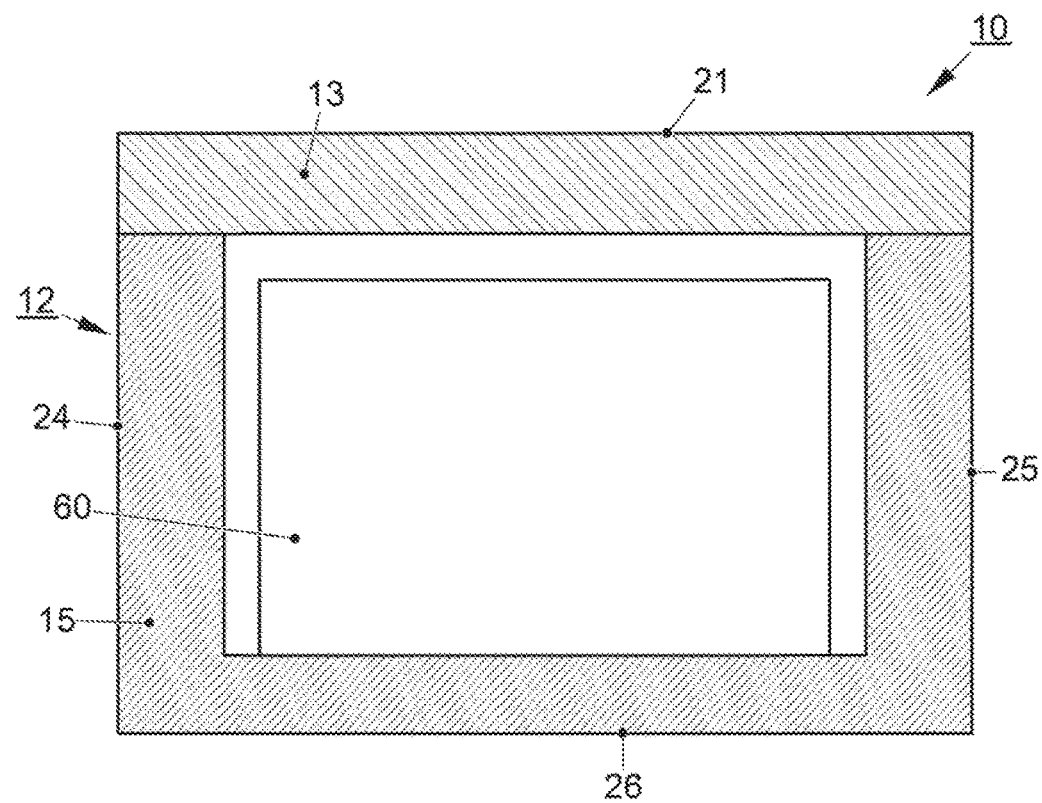
FIG. 3 shows a cross section along the line III-III of the testing device in FIG. 1.

FIG. 3 shows a cross section through the housing long the sectional line III-III. The contour of the volume body 60 can be seen, and the gas can escape in the direction of the housing opening 14 in the region outside the volume body 60. A stable housing cover, which is not destroyed during the test, is provided as the housing cover 13. This is advantageous in order to destroy only the battery cell 61, but not the test device 10, during the respective tests.

The housing cover 13 can preferably be detachably connected to the housing body 15, for example by means of a screw connection or a snap-action connection.

Figure 4:
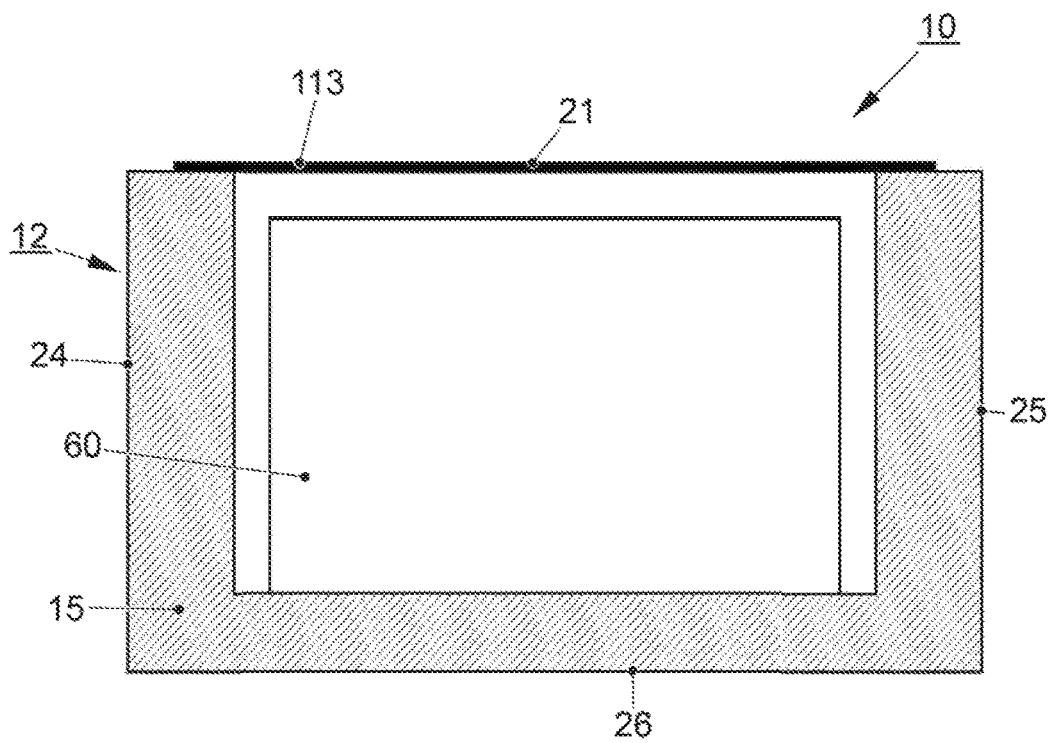
FIG. 4 shows a cross section eking the line IV-IV of the testing device in FIG. 1.

FIG. 4 shows a variant of the testing device 10 in which, instead of the housing cover 13 in FIG. 3 a relatively thin housing cover 113 is attached to the housing body 15. The housing cover 113 is preferably the housing cover for the planned series production and is usually thinner and less stable than the housing cover 13 in FIG. 3. Depending on the application, the housing cover 113 can, for example, also be fabricated from plastic or from a composite material. It is advantageous that the housing cover 113 can also be connected to the housing body 15. This also permits a test of the housing cover 113 for the series production. If, for example, the cross section through the opening 41 of the degassing element 40 is too small, the housing cover 113 deforms in an unacceptable way or starts to leak. In this case, it must be assumed that a relatively large cross section of the opening 41 is necessary or the geometric ratios in the surroundings of the battery cell 61 are unfavorable.

Figure 5:
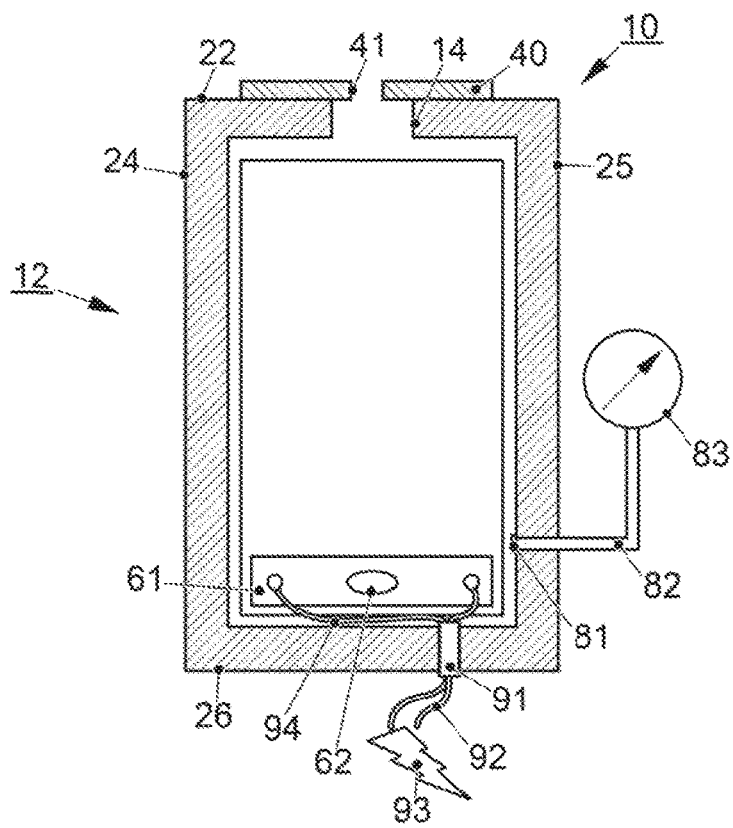
FIG. 5 shows a longitudinal section along the testing device in FIG. 1 with an electrical trigger.

FIG. 5 shows the testing arrangement 10 in FIG. 1, wherein electrical leads 92 are provided which extend through a cable feedthrough 91 in the housing 12. The electrical leads 92 can be connected to the battery cell 61 and as a result the battery cell 61 can, be made to degas by means of the electrical leads 92. This is possible, for example, by short-circuiting the electrical leads 92 or by connecting a voltage source 93.

Figure 6:
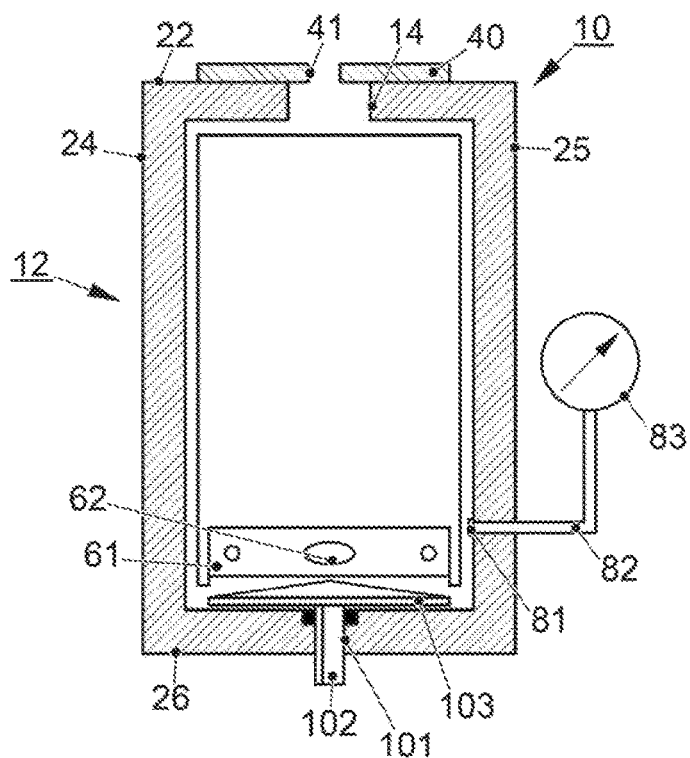
FIG. 6 shows a longitudinal section through the testing device in FIG. 1 with a mechanical trigger.

FIG. 6 shows a further embodiment of the testing device 10 in which a mechanical triggering device is provided. A plunger 102 extends through an opening 101 in the housing 12, and a plunger head 103 is provided on the plunger 102, which plunger head can be moved by the plunger 102 against the battery cell 61 which is arranged in the housing 12. In order to trigger the degassing, the plunger 102 can be moved in the direction of the battery cell 61, and the mechanical destruction f the battery cell 61 brings about the degassing.

Of course, a large number of refinements and modifications are possible within the scope the invention.

The triggering device 91, 92, 93 101, 102, 103 extends as a cable or as a plunger through the housing 12 in, a predefined housing region. In order to prevent gas from escaping through this housing region and therefore falsification of the test, the housing 12 is preferably sealed in this predefined housing region. This can be done, for example, by means of a labyrinth seal or an electrical bushing, or the region can be bonded (in the case of cables) or sealed by means of a very precise guidance.

What is claimed is:

1. A testing device for a battery, the testing device comprising:
    a housing with a housing opening;
    a degassing element positioned at the housing opening;
    a pressure sensor for use in detecting a pressure value within the housing during a test; and
    a triggering device configured to damage a battery cell of the battery and thereby cause the battery cell to degas.

2. The testing device as claimed in claim 1, wherein the housing is configured to permit detachable connection of the degassing element to the housing.

3. The testing device as claimed in claim 2, wherein an internal thread is provided on the housing to permit attachment of the degassing element to the housing with a screw.

4. The testing device as claimed in claim 1, wherein the testing device is assigned a volume body that can be positioned in the housing in addition to the battery cell to simulate the presence of additional battery cells.

5. The testing device as claimed in claim 1, wherein the housing is formed from steel.

6. The testing device as claimed in claim 1, wherein the housing has a housing body to which a housing cover can be detachably attached.

7. The testing device as claimed in claim 1, including a plurality of different degassing elements in order to test two or more different degassing elements.

8. The testing device as claimed in claim 1, wherein the degassing element is a perforated plate.

9. The testing device as claimed in claim 1, wherein the degassing element is a diaphragm.

10. The testing device as claimed in claim 1 further comprising electrical leads coupled between the triggering device and the battery cell to trigger degassing by the triggering device.

11. A testing device for a battery, the testing device comprising:
    a housing with a housing opening;
    a degassing element positioned at the housing opening;
    a pressure sensor for use in detecting a pressure value within the housing during a test; and
    a triggering device configured to cause a battery cell of the battery to degas, wherein the triggering device has a plunger with a plunger head, the plunger configured to mechanically deform the battery cell in the housing in order to trigger degassing of the battery cell.

12. The testing device as claimed in claim 1, further comprising:
    an evaluation device, the evaluation device configured to evaluate a signal of the pressure sensor during the test.

13. The testing device as claimed in claim 12, wherein the evaluation device is configured to store values of the pressure sensor.

14. The testing device as claimed in claim 1, further comprising:
    a temperature sensor configured to detect a temperature value in the housing during the test.

15. The testing device as claimed in claim 1, wherein the triggering device extends through the housing in a predefined housing region, and wherein the housing is sealed in the predefined housing region to prevent gas from escaping through the predefined housing region in order to reduce falsification of the test.

* * * * *